United States Patent [19]
Gorlov

[11] Patent Number: 5,451,137
[45] Date of Patent: Sep. 19, 1995

[54] UNIDIRECTIONAL HELICAL REACTION TURBINE OPERABLE UNDER REVERSIBLE FLUID FLOW FOR POWER SYSTEMS

[75] Inventor: Alexander M. Gorlov, Brookline, Mass.

[73] Assignee: Northeastern University, Boston, Mass.

[21] Appl. No.: 241,762

[22] Filed: Apr. 22, 1994

Related U.S. Application Data

[63] Continuation-in-part of Ser. No. 179,965, Jan. 11, 1994.

[51] Int. Cl.[6] .................... F03B 13/24; F03B 3/12; F03B 11/04
[52] U.S. Cl. .................... 415/7; 415/53.1; 415/75; 416/85; 416/177; 416/178; 416/187
[58] Field of Search ............ 415/53.1, 53.2, 53.3, 415/90 A, 75, 7, 182.1; 416/85, 176, 177, 178, 187; 60/497

[56] References Cited

U.S. PATENT DOCUMENTS

| | | |
|---|---|---|
| 135,459 | 2/1873 | Yarrell . |
| 707,857 | 8/1902 | Marburg .................... 415/7 |
| 1,396,609 | 11/1921 | Weisenborn . |
| 1,835,018 | 12/1931 | Darrieus .................... 415/53.1 |
| 2,098,876 | 11/1937 | Nash . |
| 3,986,787 | 10/1976 | Mouton, Jr. et al. .................... 415/7 |
| 4,124,329 | 11/1978 | Romanov et al. . |
| 4,162,410 | 7/1979 | Amick . |
| 4,222,700 | 9/1980 | Leuthard . |
| 4,234,289 | 11/1980 | Lebost . |
| 4,245,475 | 1/1981 | Girden . |
| 4,275,989 | 6/1981 | Gutierrez Atencio . |
| 4,293,273 | 10/1981 | Romanov et al. . |
| 4,295,783 | 10/1981 | Lebost . |
| 4,368,392 | 1/1983 | Drees . |
| 4,430,044 | 2/1984 | Liljegren . |
| 4,435,124 | 3/1984 | Zheng . |
| 4,446,378 | 5/1984 | Martinez Parra .................... 415/7 |
| 4,555,218 | 11/1985 | Jonsson et al. .................... 416/119 |
| 4,609,827 | 9/1986 | Nepple . |
| 5,074,710 | 12/1991 | Gorlov . |
| 5,222,833 | 6/1993 | Gorlov . |

FOREIGN PATENT DOCUMENTS 57874 3/1988 Japan .................... 416/176 A

OTHER PUBLICATIONS

P R S White, *A Phenimenological Design Tool for Wells Turbines*, Department of Mechanical and Manufacturing Systems, Coventry Polytechnic, UK, pp. 53–58, undated.

M. E. McCormick, B. Cochran, *A Performance Study Of A Bi-Directional Radial Turbine*, U.S. Navy Academy and Johns Hopkins University, U.S.A., 6 pages, undated.

Primary Examiner—Edward K. Look
Assistant Examiner—James A. Larson
Attorney, Agent, or Firm—Weingarten, Schurgin, Gagnebin & Hayes

[57] ABSTRACT

A reaction turbine capable of providing high speed unidirectional rotation under a reversible ultra low head pressure and/or high velocity fluid flow is disclosed. The turbine comprises a working wheel with a plurality of airfoil-shaped blades mounted transversely to the direction of fluid flow for rotation in a plane parallel to the fluid flow. The blades are arranged in a helical configuration, a modification of a delta turbine, which ensures that a portion of the blades are always positioned perpendicular to the fluid pressure, thereby creating maximum thrust to spin the turbine and ensuring a continuous speed of rotation with no accelerations and decelerations. The skewed leading edges further reduce resistance to the turbine rotation. A channel having a rectangular cross-section may be provided to direct the fluid flow to the blades. The channel may have a curved configuration having opposed changes in elevation or bulges directed towards the center of the turbine in a plane parallel to the flow of fluid to optimize the angle of attack of the fluid on the blades. At ultra low head fluid pressures, the turbine is capable of achieving high speeds, which, for gas turbines, are the speeds at which electric generators conventionally operate. For hydro applications, the helical turbine requires minimal gearing multiplication. The turbine is suitable for use in hydro-pneumatic, hydro, wind, or wave power systems.

28 Claims, 9 Drawing Sheets

FIG. 3
(PRIOR ART)
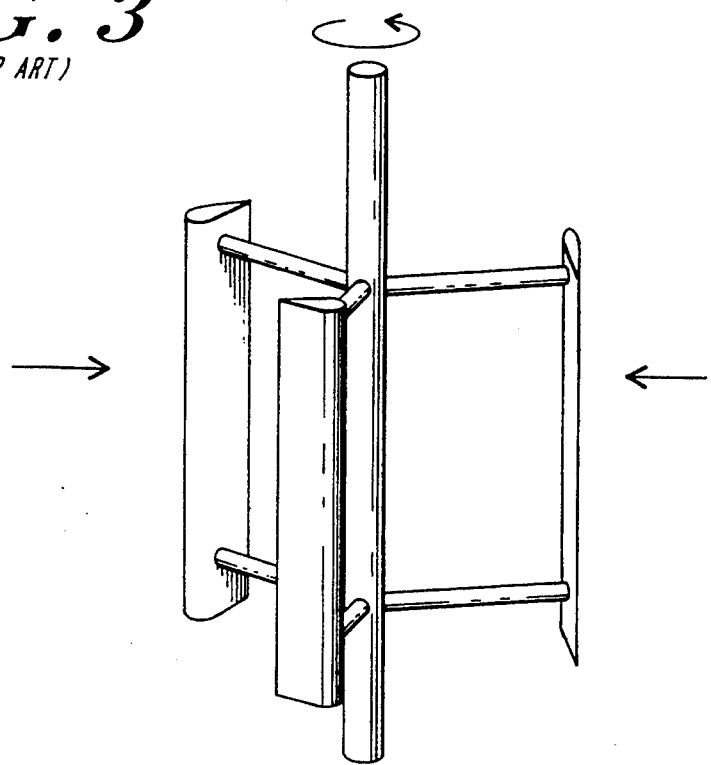
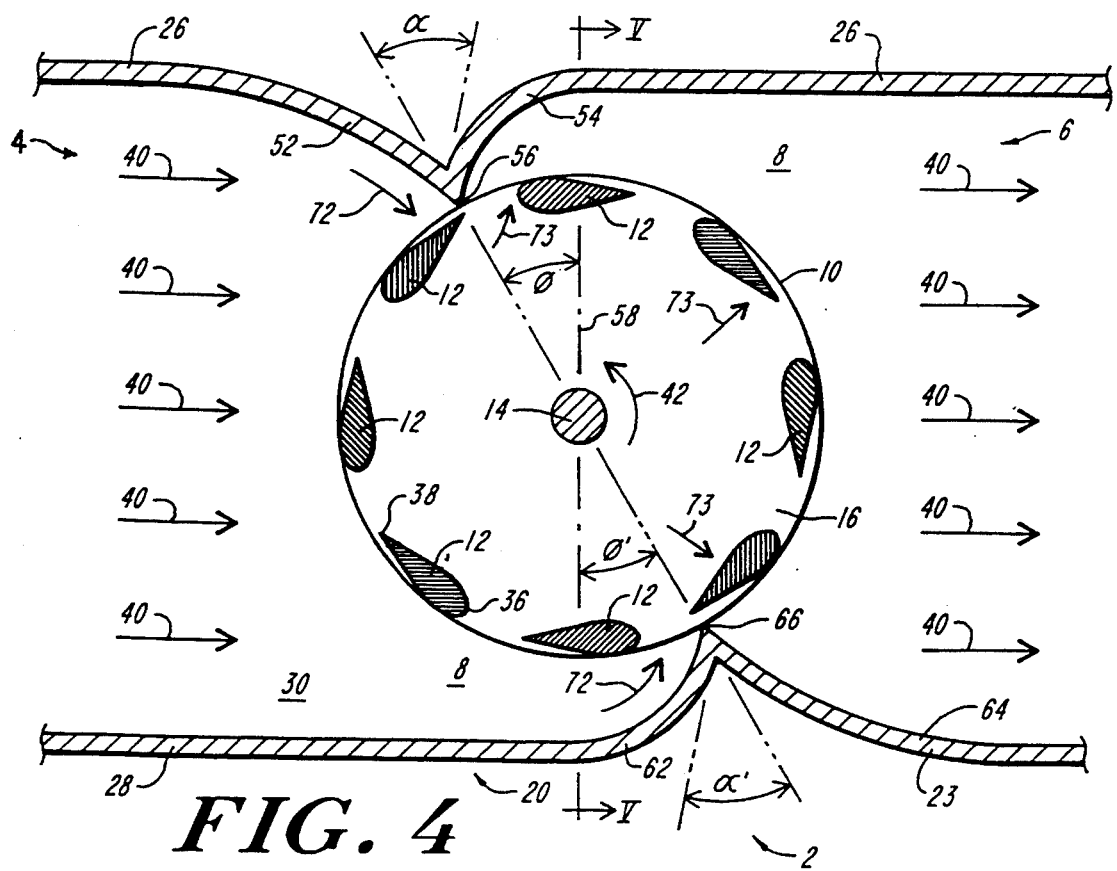
FIG. 4

UNIDIRECTIONAL HELICAL REACTION TURBINE OPERABLE UNDER REVERSIBLE FLUID FLOW FOR POWER SYSTEMS

RELATED APPLICATION

This application is a continuation-in-part of U.S. patent application Ser. No. 08/179,965, filed on Jan. 11, 1994, incorporated herein by reference.

FIELD OF THE INVENTION

This invention relates to reaction turbines and more particularly to unidirectional reaction turbines operable under reversible fluid flows for use with hydro-pneumatic, hydro, wind, or wave power systems.

BACKGROUND OF THE INVENTION

Hydro-pneumatic power systems are used for generating power from the tidal or current motion of water in oceans, bays, and rivers. Typically, such systems require a high water head. However, a system has been developed to generate power using a lower water head. This system is described in U.S. Pat. Nos. 5,074,710 and 5,222,833, the disclosures of which are incorporated herein by reference.

This system uses a pair of chambers, each having upstream ingress and downstream egress ports sealable by a water gate. The water gates are cross-coupled on a common shaft such that the upstream ingress water gate of one chamber is coupled for synchronous movement with the downstream egress water gate of the other chamber. The sets of cross-coupled water gates open and close alternately in synchronism. Thus, when one set of gates is open, water enters one chamber from the upstream flow and exits the other chamber into the downstream flow. When the water levels in the chambers equilibrate with the upstream and downstream water levels, the open set of gates closes by a counterweight and the opposite set of gates opens under the force of the water level differential. Water begins filling the chamber with the low water level and emptying from the chamber with the high water level. Thus, a cycle of alternately filling and emptying the water chambers is maintained.

Each chamber contains an air space above the water surface. The chambers are interconnected to each other by a channel or duct through which the air may flow. As one set of cross-coupled gates opens, air pressure builds up in the chamber which fills with water and a partial vacuum builds up in the chamber which is emptying of water, thereby generating a flow of air through the channel from the filling chamber to the emptying chamber. When the open set of gates closes and the opposite set of gates opens, the build up of pressure and vacuum in the chambers is reversed. Thus, a flow of air through the channel in the opposite direction is generated. An air turbine connected to an electric generator is mounted in the channel to convert the energy of the flowing air to electric energy.

As stated, the air flow through the channel periodically reverses direction. Either complex valving to redirect the air flow into a single directional stream prior to driving the turbine or a unidirectional air turbine, that is, one capable of providing unidirectional rotation from bidirectional air flow, is required. Generally, three basic types of unidirectional reaction turbines are known, the Wells turbine, the McCormick turbine, and the Darrieus turbine.

The Wells reaction turbine comprises a series of rectangular airfoil-shaped blades arranged concentrically to extend from a rotatable shaft, as shown in FIG. 1. Typically, the turbine is mounted within a channel that directs the fluid flow linearly along the axis of the rotatable shaft. The blades are mounted to extend radially from the rotatable shaft and rotate in a plane perpendicular to the direction of fluid flow. Regardless of the direction in which the fluid flows, the blades rotate in the direction of the leading edge of the airfoils, which, in FIG. 1, is counterclockwise.

The Wells turbine is capable of rapid rotation. Its blades move substantially faster than the flowing air, causing high noise. Also, its efficiency is relatively low, first, because the rectangular blades create turbulence in the slower air, and second, because the effective surface area of the airfoil-shaped blades is limited to the outer tips, where the linear velocity is greatest. The blades cannot capture all of the available energy in the flowing fluid.

The McCormick turbine comprises a series of V-shaped rotor blades mounted concentrically between two series of stator blades, as shown in FIG. 2. The rotor blades are mounted for rotation in a plane perpendicular to the direction of fluid flow. The stator blades direct fluid flow to the rotor blades. To achieve unidirectional rotation with bidirectional fluid flow, the outer stator blades are open to fluid flowing from one direction, while the inner stator blades are open to fluid flowing from the opposite direction.

The McCormick turbine is more quiet and could be more efficient than the Wells turbine. However, its rotational speed is too slow for direct operation of an electric generator. Gearing is required to increase the speed up into the range of 1800 to 3600 rpm. Its configuration is also complex and expensive to manufacture.

The Darrieus machine is a reaction turbine with rectangular airfoil-shaped blades oriented transversely to the fluid flow and generally parallel to the axis of rotation, as shown in FIG. 3. The blades may be attached to the axis by circumferential end plates, struts, or by other known means. In some variations, the blades are curved to attach to the ends of the axis. A Darrieus reaction turbine having straight rectangular blades, mounted vertically in a rectangular channel, has been placed directly in a flowing body of water to harness hydropower. As with any reaction turbine, the rectangular blades of the Darrieus turbine rotate much faster than the fluid flow, causing turbulence in the fluid and lowering the efficiency of the turbine.

Thus, a need still exists for a quiet, efficient, simple, unidirectional reaction turbine that can operate at high speeds without gearing multiplication.

SUMMARY OF THE INVENTION

The present invention provides a unidirectional reaction turbine capable of achieving high speeds needed for industrial electric generators under ultra low head pressure fluid flow and/or flows of velocities of 5 feet per second or greater. For hydro applications, minimal gearing multiplication is required. The turbine comprises inflow and outflow fluid channels, a turbine chamber, and a working wheel having a plurality of airfoil-shaped blades mounted transversely to the direction of fluid flow for rotation in a plane parallel to the direction of fluid flow. The blades extend between two supporting members, such as a pair of parallel discs, mounted on a rotatable shaft. The blades are arranged in a circle and are oriented so that the chord of each airfoil generally forms the chord of an arc of the circle. A channel is provided to direct the fluid flow to the blades. The blades rotate in the direction of the leading edge of the airfoil, regardless of the direction of fluid flow.

Since the rotation at the outer circumference of the turbine rotor is faster than the fluid flow, the flow tends to twist in the channel in the direction of the turbine's rotation. The channel walls are arranged with a circular configuration in a plane parallel to the flow of fluid to the turbine to follow the direction of the fluid flow and to optimize the angle of attack of the fluid on the blades. Energy losses are thereby reduced and efficiency is increased. Specifically, the top and bottom walls of the channel comprise two circular sections in a plane parallel to the direction of fluid flow. The sections meet along a line which is offset from the top and bottom of the circular blade trajectory and which is as close as possible to the blades' trajectory leaving a minimal clearance without interfering in the blades' rotation. In one embodiment, the top and bottom walls also-incorporate a V-shaped or other linear or curvilinear-shaped configuration in a plane perpendicular to the direction of air flow to smooth and direct the flow of fluid to the blades. In another embodiment, the blades have the shape of a delta or other curvilinear wing to reduce an impact on the blades moving in the slower fluid and passing the sections of the channel having the narrowest blade clearance, to prevent choking of the flow. With the delta- or other curvilinear-shaped blades, the channel may have a simpler rectangular cross-section. In a third embodiment, the blades are arranged in a helical configuration, which allows the channel to have a rectangular cross-section and ensures that a portion of the blades are always positioned perpendicular to the fluid pressure, thereby creating maximum thrust to spin the turbine. The continuous helical blades provide a continuous speed of rotation uninterrupted by accelerations and decelerations that accompany prior art turbines, such as the Darrieus turbine, as the blades pass the least and most efficient thrust zones. The skewed leading edges of the helical configuration further reduce resistance to the turbine rotation.

For gas turbine applications under ultra low head pressure fluid flow, the turbine can readily rotate at speeds of 1800 or 3600 rpm, the speeds at which conventional industrial generators typically operate, and can achieve efficiencies higher than the other turbines discussed. The turbine can operate at higher speeds if necessary by varying the number and area of the blades. For hydro applications, under ultra low head flow or any strong current of 5 feet per second or greater, a minimal gearing application is required, which is less than needed for prior art turbines.

In the case of hydro-pneumatic energy conversion, the channel interconnects a pair of chambers in which air is alternately compressed and expanded due to the alternate filling and emptying of the chambers with water. The alternate compression and expansion causes the air flow to alternate in direction through the connecting channel. The reaction turbine, mounted in the channel, is in this manner able to capture the energy in the flowing air and convert it to rotary mechanical energy. The turbine is connected to an electric generator for generation of electrical energy. No additional gearing to increase the speed of the air turbine to the generator's speed is required.

In a hydro application, the turbine is mounted in a vessel located in a strong current of 5 feet per second or greater, such as in a tidal channel. The turbine is located just below the surface of the water, where the current velocity is greatest, and is retained in that location by virtue of the vessel's rise and fall with the water. The helical turbine embodiment is particularly suited to this application. A housing to channel the flow to the turbine may by provided if desired, but is not necessary if the current velocity is sufficiently great. The turbine is connected to a suitable electric generator, which may be mounted on the vessel in a water tight chamber. Since the turbine is located in the water, minimal gearing multiplication is needed to increase the turbine rotation speed to that of the generator.

DESCRIPTION OF THE DRAWINGS

The invention will be more fully understood from the following detailed description taken in conjunction with the accompanying drawings in which:

FIG. 3 is a schematic illustration of a prior art Darrieus turbine;

FIG. 4 is a cross-sectional side view of a reaction turbine according to the present invention;

DETAILED DESCRIPTION OF THE INVENTION

Figure 1:
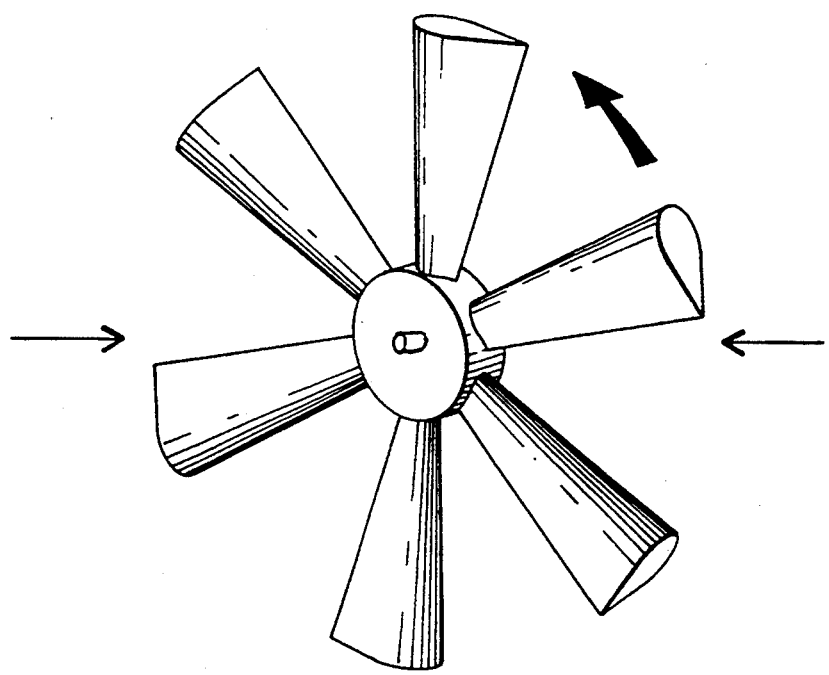
FIG. 1 is a schematic illustration of a prior art Wells turbine.
Figure 2:
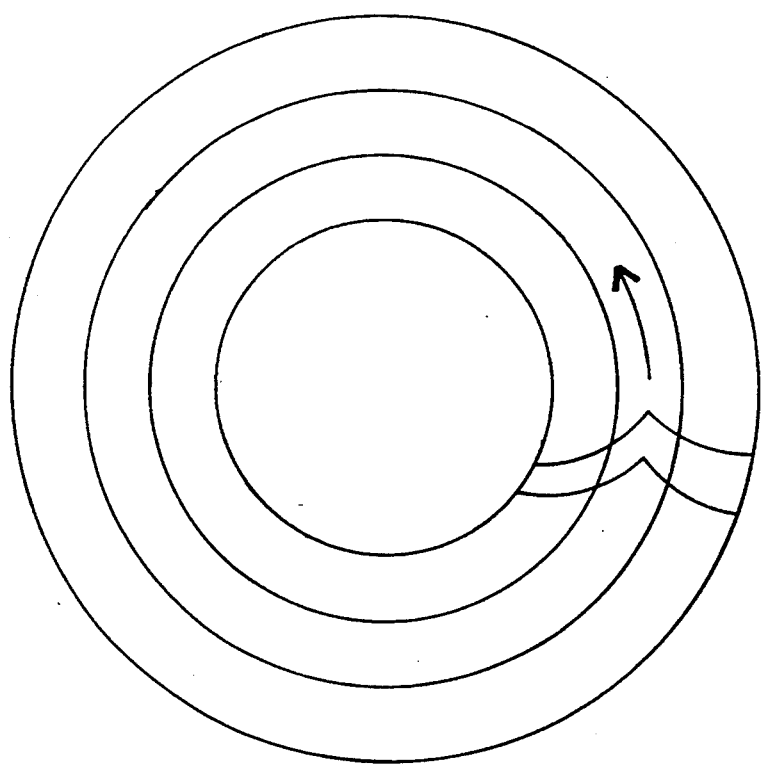
FIG. 2 is a schematic illustration of a prior art McCormick turbine.
Figure 5:
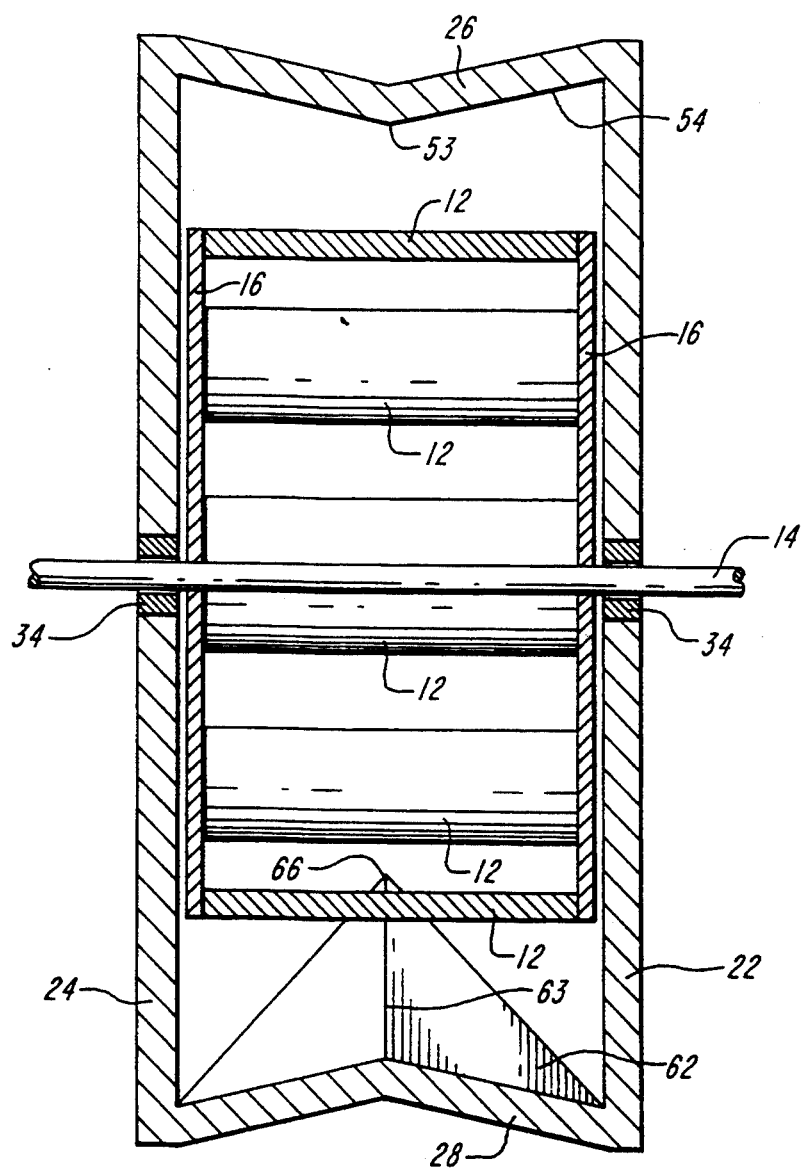
FIG. 5 is cross-sectional view along line V—V of the turbine of FIG. 4.

A reaction turbine 2 according to the present invention is shown in FIGS. 4 and 5. The turbine comprises inflow and outflow fluid channels 4, 6, a turbine chamber 8, and a working wheel 10 having a plurality of airfoil-shaped turbine blades 12 supported for rotation on a rotatable shaft 14 by one or more turbine blade support members 16. The airfoil-shaped blades may be formed from any suitable material, such as a steel or plastic material. The blade support members 16, which, in the embodiment shown, comprise parallel, circular discs, are fixedly mounted in spaced relation on the rotatable shaft 14 such that rotation of the blades 12 and discs 16 causes the shaft 14 to rotate as well. The blades 12 are fixedly mounted to extend transversely from one disc 16 to the other disc 16 and are spaced radially from the rotatable shaft 14. The blade support members may comprise other configurations, such as a single central disc, radial spokes, or the like.

The turbine 10 is mounted inside a channel 20 or duct. The channel generally comprises opposed side walls 22, 24, a top wall 26, and a bottom wall 28 which form a passage 30 for directing the flow of fluid to the turbine. The shaft 14 is oriented transversely to the flow of fluid through the channel and is mounted for rotation, for example, via bearings 34 in the side walls of the channel.

Each blade 12 has an airfoil shape with a leading edge 36 and a trailing edge 38 oriented transversely to the flow of fluid. Preferably, the blades are formed with a suitable airfoil profile, as is known in the art. The blades 12 are mounted at the outermost diameter of the circular discs 16 and are generally oriented to lie along a circle defined by the outer diameter of the discs such that the chord of each airfoil generally forms the chord of an arc of the circle. Any number of blades may be provided. The chords of the blades cover up to 90 percent of the circumference of the circle defined by the discs. Typically, the diapason ranges between 60 and 90 percent, although the exact value depends on the application. If too large an opening is left between blades, substantial energy from the fluid flow can be lost to the system.

Referring to FIG. 4, fluid flowing in the direction of arrows 40, along the channel 4, causes the turbine 10 to rotate in the direction of the leading edge 36 of the blades as shown by arrow 42. Similarly, referring to FIG. 6, fluid flowing in the opposite direction, designated by arrows 44, along the channel 6, also causes the turbine to rotate in the same direction, the direction of the leading edge 36 of the blades 12. As is apparent, the turbine rotates in a plane parallel to the flow of fluid. In addition to covering up to 90 percent of the circumference, the blades 12 should be spaced radially as far from the rotatable shaft 14 as practicable to capture the greatest amount of energy in the flowing fluid. Similarly, the longer the chord of the blades, the greater the fluid flow which the turbine can handle for the same speed of rotation.

Figure 6:
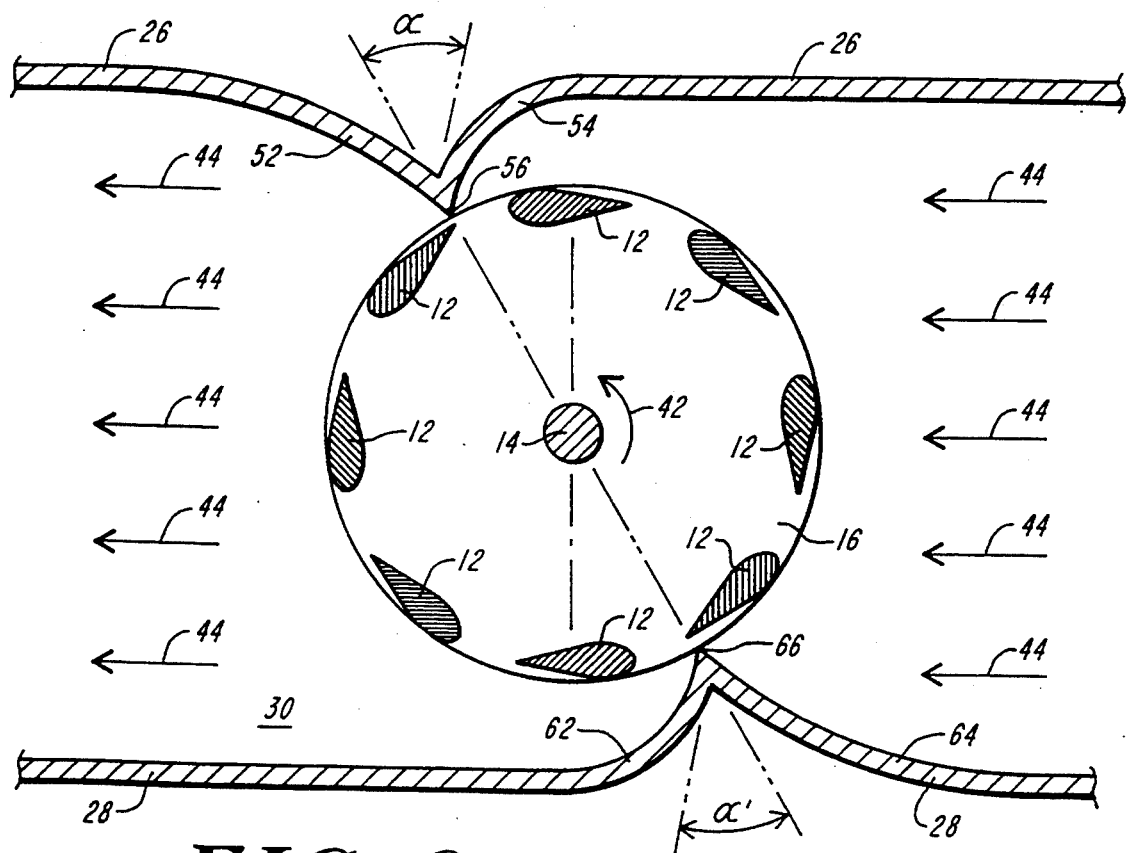
FIG. 6 is a cross-sectional side view of the turbine of FIG. 4 operating under fluid flow from the opposite direction.
Figure 8:
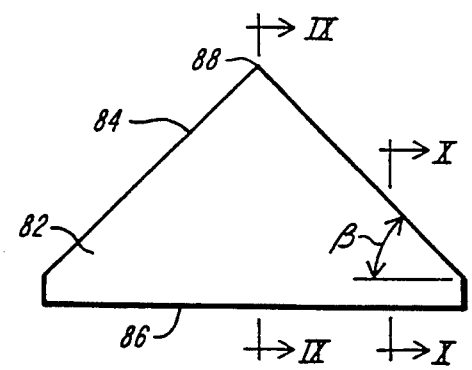
FIG. 8 is a plan view of a single delta turbine blade of the embodiment of FIG. 7.
Figure 9:
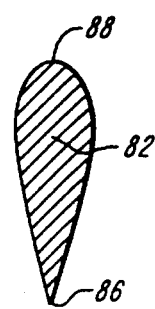
FIG. 9 is a cross-sectional view along line IX—IX of FIG. 8.
Figure 10:
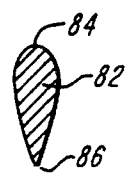
FIG. 10 is a cross-sectional view along line X—X of FIG. 8.

Rotation of the turbine tends to twist the flow of fluid past the turbine out of a generally linear path. The flow lines tend to follow the direction of rotation of the turbine. The channel 20 of the present invention has a curved configuration which generally follows the flow lines and optimizes the angle of attack of the fluid on the blades. Parallel to the fluid flow, at least one and preferably both the top wall 26 and the bottom wall 28 of the channel 20 incorporate bulges or changes in elevation, as best seen in FIGS. 4 and 6. Specifically, the top wall 26 comprises a first curved section 52 and a second curved section 54. Preferably the curvature comprises a circular arc. The curved sections 52, 54 meet along a point 56 as close to the trajectory of the blades 12 as possible to provide minimal clearance between the blades and the channel. When the fluid flow is in the direction of arrows 40 in FIG. 4, the first section 52 is upstream of the turbine and the second section 54 is downstream of the turbine. When the fluid flow is reversed, as in FIG. 6, the first section 52 is downstream of the turbine and the second section 54 is upstream.

Similarly, the bottom wall 28 comprises a first curved section 62 and a second curved section 64. Preferably, the curvature comprises a circular arc. The curved sections meet along a point 66 as close to the trajectory of the blades 12 as possible to provide minimal clearance between the blades and the channel. When the fluid flow is in the direction of arrows 40 in FIG. 4, the first section 62 is upstream of the turbine and the second section 64 is downstream of the turbine. When the fluid flow is reversed, as in FIG. 6, the first section 62 is downstream of the turbine and the second section 64 is upstream. The top and bottom curved sections 52, 54, 62, 64 may be formed in any suitable manner, such as by providing a channel with appropriately curved walls or by providing appropriately curved inserts within a rectangular channel.

The channel 20 has a rectangular cross-section far from the turbine. In a first embodiment, in the turbine chamber 8, the top wall 26 is bisected longitudinally into two lengthwise sections divided by a centerline 53, as shown in FIG. 5. The centerline 53 dips toward the trajectory of the turbine wheel, imparting to the top wall a slight angle or V shape in transverse cross-section, i.e., in a plane perpendicular to the flow of the fluid.

Similarly, in the turbine chamber 8, the bottom wall 28 is bisected longitudinally into two lengthwise sections divided by a centerline 63. The centerline 63 rises toward the trajectory of the turbine wheel, imparting to the bottom wall a slight angle or V shape in transverse cross-section, i.e., in a plane perpendicular to the flow of the fluid. The angles of the top and bottom walls become continually narrower as the centerlines approach the turbine, until they reach their narrowest angle at the point of minimal clearance with the blade's trajectory. The angle or V shape helps to smooth out and direct the fluid approaching the turbine and allows the fluid to pass the rectangular blades at the points 56, 66 of minimal clearance with the top and bottom walls without choking. The wall sections on each side of the centerlines may be planar, as shown in FIG. 5, or may have a concave curvature to provide greater flow of fluid to the blades if desired.

As can be seen in FIG. 4, the top point 56 is angularly offset in the direction of rotation from an axis 58 through the center of rotation of the turbine and perpendicular to the fluid flow by an angle $\phi$. The bottom point 66 is also angularly offset in the direction of rotation from the axis 58 through the center of rotation of the turbine and perpendicular to the fluid flow by an angle $\phi'$. $\phi'$ is preferably the same as the angle $\phi$, so that the configurations of the top and bottom channels are symmetric.

φ and φ' may range from slightly greater than 0° to 90°. In general, the higher the speed of turbine operation, the greater the angle φ or φ' should be. Other parameters affecting φ and φ' are the diameter of the turbine, the shape of the turbine blades, the material out of which the channel and blades are formed, and the surface finish or roughness. The preferred range of the angle φ for anticipated operational turbine speeds has been determined experimentally to lie between 15° and 45°.

Also, the top point 56 forms the vertex of an angle α between the tangents at the top point 56 to the circles defining the configuration of each top section 52, 54. Similarly, the bottom point 66 forms the vertex of an angle α' between the tangents at the bottom point 66 to the circles defining the configuration of each bottom section 62, 64 at the bottom point 66. Preferably, α and α' are the same, maintaining the symmetry between the top and bottom channels. The preferred range of the angles α and α' has been determined experimentally to lie between 30° and 45°.

In operation, the circular curvature of the top and bottom walls imparts a significant radial component, with respect to the surface of each blade, to the fluid stream striking all of the blades, as indicated generally by the arrows 72. When the fluid flows in the direction of the arrow 40 of FIG. 4, the force driving the turbine is increased primarily by the fluid striking the blades along the lower part of the trajectory. Similarly, when the fluid flow is reversed, as in FIG. 6, fluid striking the blades at the upper part of the trajectory is primarily effective in increasing the force driving the turbine. Fluid flow striking the blades on the opposite or downstream side of the turbine also has a significant radial component, as shown by arrows 73, which also aids in driving the turbine. In operation, the linear velocity of the turbine blades is greater than the velocity of the fluid.

Figure 7:
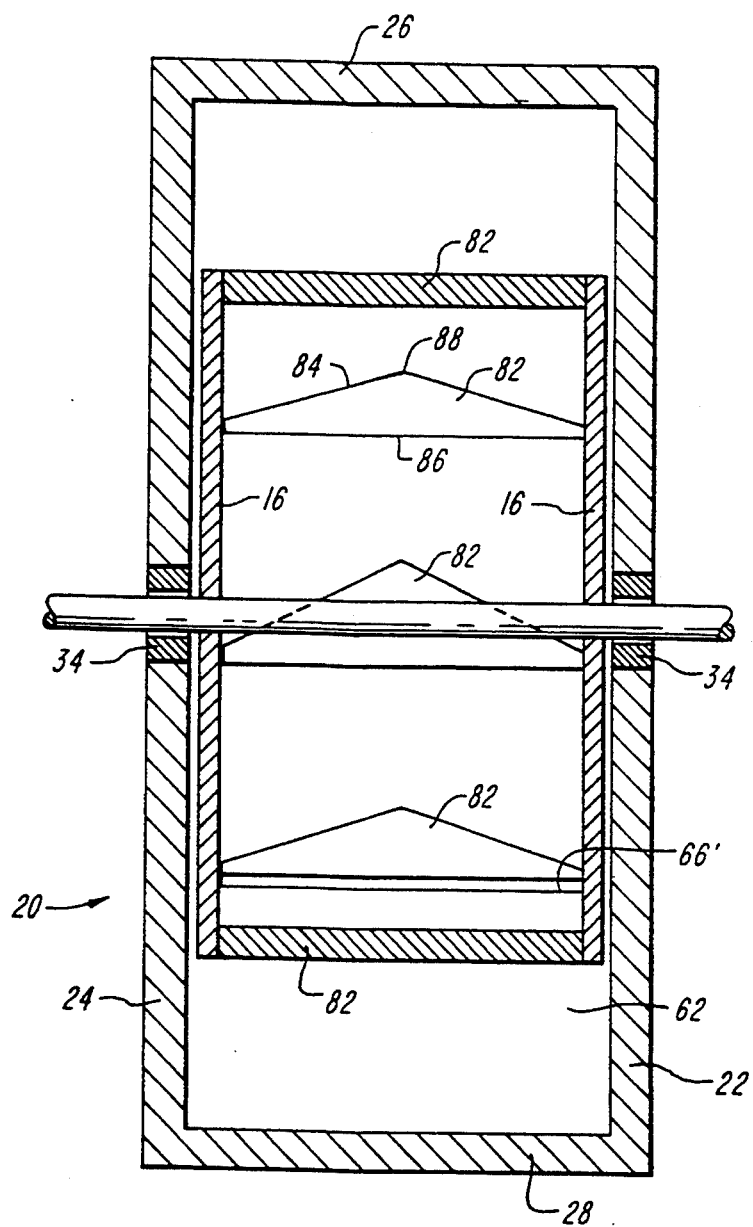
FIG. 7 is a cross-sectional view of a further embodiment of the reaction turbine of the present invention.
Figure 12:
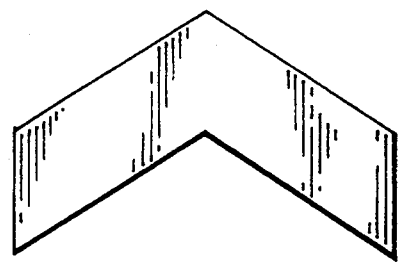
FIG. 12 is a plan view of an alternative embodiment of a single delta turbine blade.

A further embodiment of the present invention is shown in FIGS. 7 through 10. As can be seen in FIG. 7, which is a view similar to that of FIG. 5, the channel 20 has a rectangular cross-sectional configuration near the turbine, rather than the V-shaped top and bottom walls as shown in FIG. 5. The blades, shown more particularly in FIGS. 8 through 10, have a delta shape, with a leading edge 84 and a trailing edge 86. The angle β, the angle of the sides to a line normal to the blade's centerline, typically ranges from 10° to 60°. The exact value depends on the particular application. The greater the fluid velocity, the greater the angle, to reduce frictional losses between the blades and the fluid. The greatest thickness of the blades occurs near the blade's nose 88, which presents the least width transversely to the flow of fluid. The least thickness of the blades occurs at the trailing edge 86. Although a delta shape, as shown, is preferred, other curvilinear shapes may be used. FIG. 12 shows a further example of a suitable delta blade.

Due to the rectangular cross-section of the channel, the top and bottom curved sections 52, 54, 62, 64, approach the turbine along a line, indicated by bottom line 66' in FIG. 7, rather than a point, as in FIG. 5. A similar line (not shown) is present on the top wall. If rectangularly-shaped blades, such as the blades 12, were used in a rectangular channel, a choke situation could develop. As the blades pass the line 66' of minimal clearance, the flow would be restricted and could potentially choke. The delta blades 82 of the present invention eliminate this problem, because the thickest part of the blade occurs near the nose 88, which presents the least transverse blade width to the flow. Thus, the fluid can continue to flow along and past the sides of the blades. The greatest transverse blade width occurs at the trailing edge 86 of the blade, which also has the least blade thickness. Accordingly, the clearance between the outer blade surface and the line 66' is increased and the fluid can continue to flow over the outer surface of the blades. In this manner, a choke situation is obviated.

Figure 13:
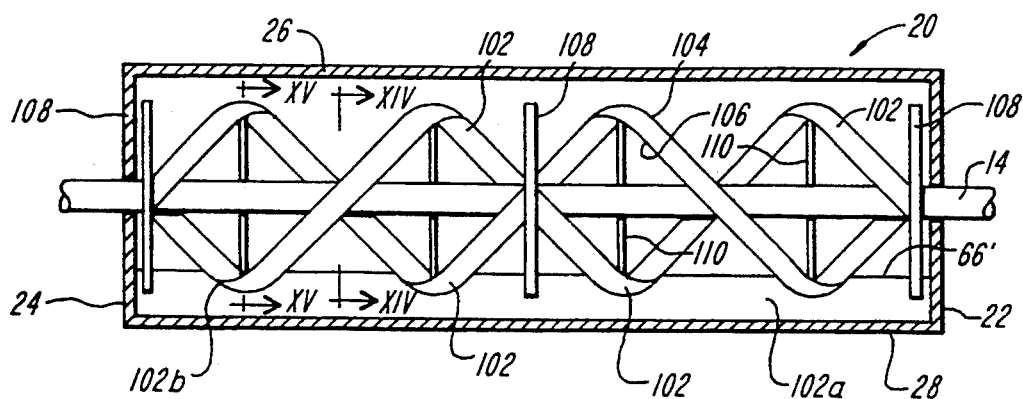
FIG. 13 is a frontal view of a further embodiment of the reaction turbine of the present invention.
Figure 14:
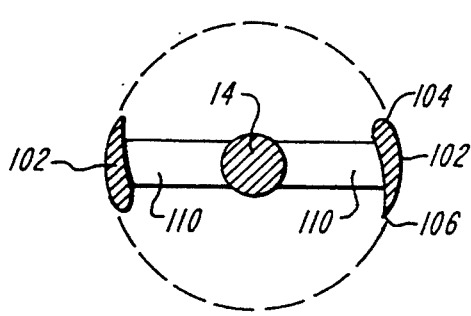
FIG. 14 is a cross-sectional view along line XIV—XIV of FIG. 13.
Figure 15:
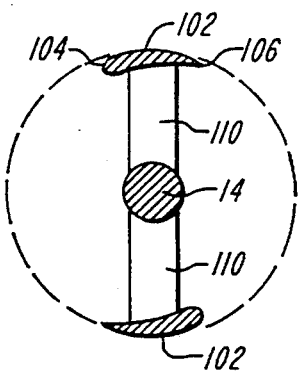
FIG. 15 is a cross-sectional view along line XV—XV of FIG. 13.

An additional embodiment of the invention, a modification of the blade shown in FIG. 12, is shown in FIGS. 13 through 17. One or more airfoil-shaped blades 102 are arranged in a helical configuration about the rotatable shaft 14 to extend transversely across the turbine chamber. The helical configuration is suitable for longer turbine blades, typically 10 feet or greater in length. The helical turbine is particularly suitable for hydro applications where strong water currents develop, and may be installed on a vessel, as discussed further below, or in the body of any low head dam in a river. The blades have a leading edge 104 and a trailing edge 106. Preferably, the blades are divided into two halves 102a, 102b, as shown in FIG. 13, in which one half is a left-handed helix and the other half is a right-handed helix. In this manner, the components of the thrust force which extend parallel to the shaft 14 cancel each other out, as discussed further below. However, all left-handed or all right-handed helixes or any other suitable helical configuration may be provided if desired. The blades are attached by blade support members 108 which may comprise parallel, circular discs which are fixedly mounted in spaced relation on the rotatable shaft 14 near each of the opposed side walls 22, 24 and in the middle. In this manner, rotation of the blades and discs causes the shaft to rotate as well. The blades are fixedly attached at their ends to extend transversely from one disc to the other disc, creating a non-solid, fluid transmitting cylinder. In addition, any suitable number of radial spokes 110 may be provided which extend perpendicularly from the rotatable shaft to each blade at spaced intervals. Such radial spokes increase the integrity and structural strength of the system. Alternatively, the blade support members may comprise other configurations, such as a single central disc, radial spokes alone, or the like.

As with the embodiment of FIGS. 7 through 10, the channel 20 may have a rectangular cross-sectional configuration near the turbine, rather than the V-shaped top and bottom walls as shown in FIG. 5. A choke situation does not arise, because only a single point or a few points of the leading edge of each blade pass the line 56', 66' of minimal clearance at a time. The skewed leading edges 104 further reduce resistance to the turbine rotation. In addition, with the helical configuration, the elevational changes of the top and bottom walls may be eliminated in some applications, such as in water current flows of sufficiently great velocity. Alternatively, with the helical configuration, it is also possible to eliminate the channel entirely if desired.

Figure 16:
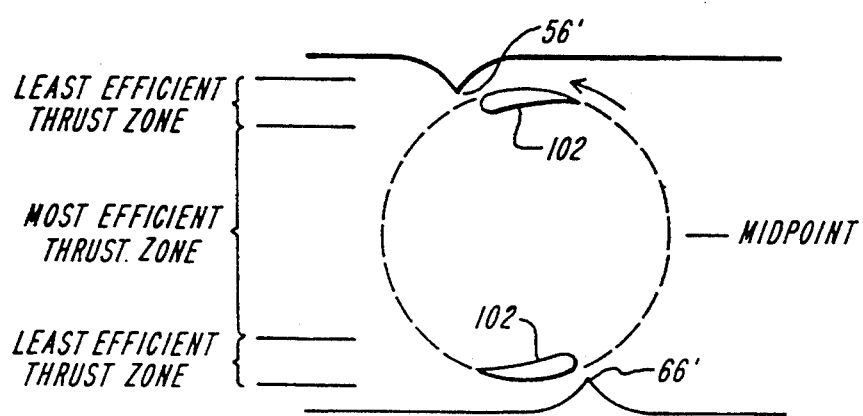
FIG. 16 is a schematic cross-sectional side view of a reaction turbine according to the present invention illustrating zones of thrust efficiency.

In addition, a portion of the blades 102 are always positioned perpendicular to the fluid pressure, thereby creating maximum thrust to spin the turbine. Referring to FIG. 16, the fluid impinging on the blades at the midpoint between the top and bottom walls creates the most efficient thrust, whereas the fluid impinging on the blades closer to the top and bottom walls creates the least efficient thrust. Two least efficient thrust zones, near the top and bottom walls, and a most efficient thrust zone, near the center, are depicted in FIG. 16 merely for illustrative purposes. It will be appreciated that in actuality the efficiency of the thrust varies continuously from a minimum at the top to a maximum at the midpoint to a minimum at the bottom, with no abrupt break therebetween. In view of the maximum thrust at the midpoint, it is desirable that a blade 102 be always passing the midpoint of the channel to ensure that no break in thrust on the blades occurs. The helical configuration of the present invention accordingly ensures that a portion of the blades is always positioned at this location, perpendicular to the fluid pressure, thereby creating maximum thrust to spin the turbine. In this manner, the blades rotate continuously at a constant speed, without the accelerations and decelerations which accompany turbines in which the blades pass discontinuously through the most efficient and least efficient zones.

Figure 17:
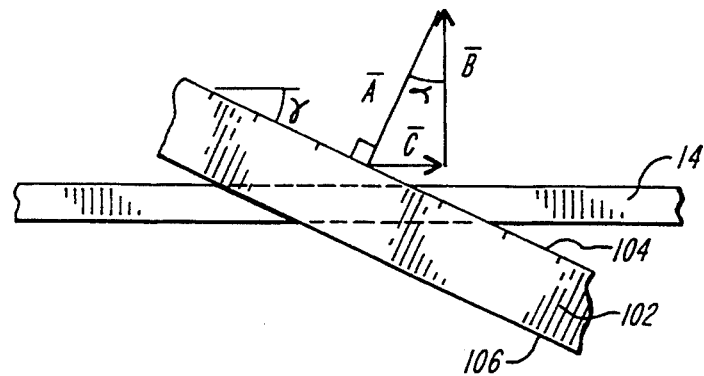
FIG. 17 is a fragmentary view of a single turbine blade of the embodiment of FIG. 13 illustrating resolution of the thrust force on the blade.

A resolution of the thrust force exerted on each blade is illustrated in FIG. 17. The thrust A exerted on each blade 102 is perpendicular to the leading edge 104 of the blade. A ranges from a minimum at the top of the channel to a maximum at the midpoint of the channel. The component B, perpendicular to the rotatable shaft 14, is the working component of the thrust A, the component which pushes the blade with respect to the shaft. The component C, parallel to the rotatable shaft 14, exerts a force parallel to the shaft on the shaft bearings. By providing two halves with oppositely directed helixes, as shown in FIG. 13, these components cancel each other out, thereby minimizing wear on the shaft bearings. The angle $\gamma$, the angle made by the leading edge of the blade with respect to the shaft, generally ranges from 0° to 30°. At 0°, the blades are parallel to the shaft; thus, $\gamma$ is preferably at least slightly greater than 0°. The exact value of $\gamma$ depends on the particular application.

The rotatable shaft 14 of the reaction turbine of the present invention may be connected in any manner known in the art to an electric generator. In gas, the turbine is capable of rotating at speeds of 1800 or 3600 rpm, the speeds at which conventional industrial generators operate, and achieving the highest efficiencies. Higher speeds can be achieved if necessary. In this manner, the energy in the flowing fluid is readily converted to usable electrical energy without using gearing speed multiplication. In water, the turbine is capable or rotating at speeds of 120 rpm or greater, which is greater than the speeds achievable by the Darrieus turbine in water. Thus, only a minimal gearing multiplication is required to convert the energy in the flowing fluid to electrical energy.

Figure 11:
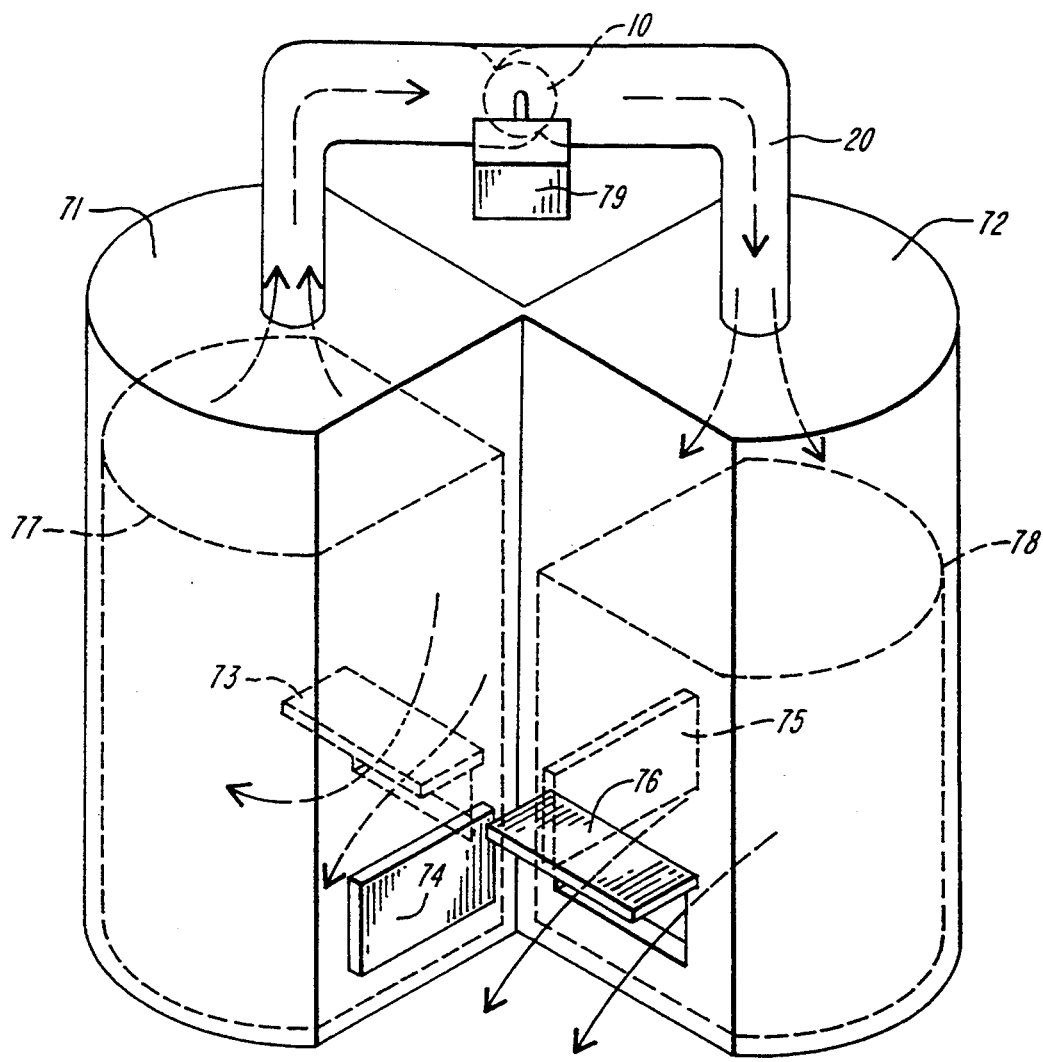
FIG. 11 is a schematic illustration of the reaction turbine of the present invention in operation in a hydro-pneumatic power system.

The reaction turbine of the present invention is shown in FIG. 11 in operation in association with a hydro-pneumatic power generation system, such as that disclosed in U.S. Pat. Nos. 5,074,710 or 5,222,833. As generally described above, the system comprises two water chambers 71, 72 interconnected by ingress and egress ports 73, 74, 75, 76 on common shafts. As the water level 77, 78 in the two chambers alternately rises and falls, air in the space above the water level is alternately compressed and expanded. The air flows through the channel 20 interconnecting the two chambers, alternating directions in synchronism with the rising and falling water levels.

The reaction turbine 10 of the present invention is mounted within the channel. The flowing air causes the turbine to rotate as described above. When the flow of water through the chambers reverses, the flow of air through the channel also reverses. However, the turbine continues to rotate in the same direction. During the air flow cycle, the air flows in a first direction and the speed of the air increases to a maximum. The speed then decreases until it reaches zero and then begins again to increase in the opposite direction as the air flows in the opposite direction. The turbine continues to rotate in the same direction, although its rotation speed varies somewhat with the increase and decrease in the speed of the air.

The turbine is connected in any suitable manner to an electric generator 79 for generating electricity. The turbine can reach speeds of 1800 or 3600 rpm with water heads of as low as one or two feet. Thus, the system is suitable for generating power on small rivers. Further, the water chambers can operate without any water head differential if the velocity of the current flow is strong enough, such as in some tidal estuaries. Accordingly, the present system can be used in locations where strong currents are generated, but construction of a dam is not economically feasible or environmentally desirable. The reaction turbine of the present invention may also be used in wind and wave power systems to harness the energy of the wind and waves.

Figure 18:
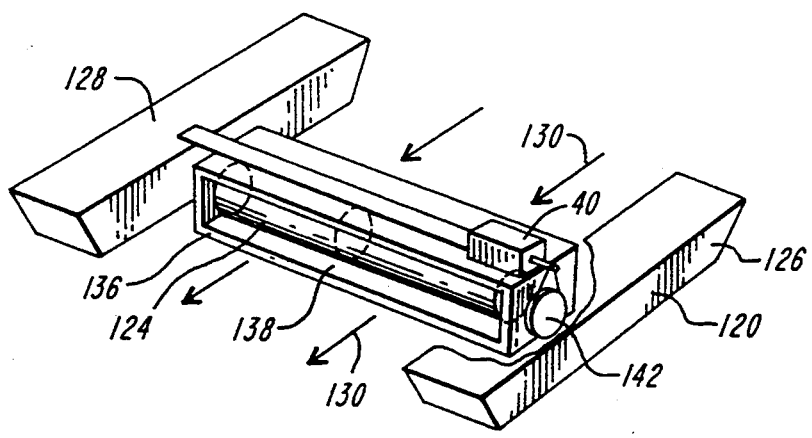
FIG. 18 is a perspective view of a system for harnessing hydro energy according to the present invention.
Figure 19:
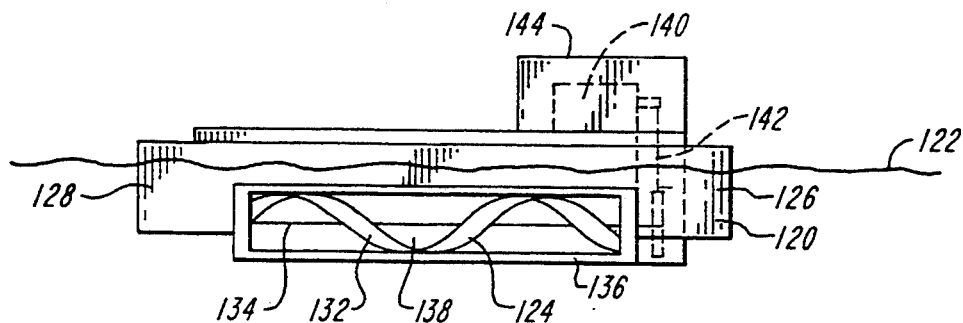
FIG. 19 is a frontal view of the system of FIG. 18.
Figure 20:
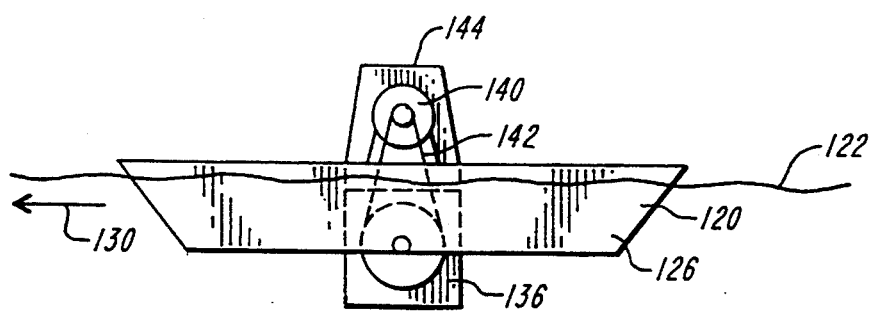
FIG. 20 is a side view of the system of FIG. 18.

The reaction turbine of the present invention is shown in FIGS. 18–20 in an application in which power may be generated from a water current flow having a sufficiently strong and, in many cases, reversible velocity of at least 5 feet per second, such as in some tidal estuaries where there is no water head differential. In such a situation, the greatest power generation comes from the greatest velocity flow. In areas of flowing current, the velocity is greatest at the surface of the water and decreases to a minimum at the river or estuary bottom. In a tidal estuary, the water level increases and decreases with the tides. In some areas, the water level fluctuations are substantial. In such areas, a fixed power generation installation cannot take advantage of the greatest velocity flow at the surface. However, the reaction turbine of the present invention may be installed on a vessel 120, as shown in FIGS. 18 through 20. The vessel 120 rises and falls with the fluctuating water level 122, ensuring that the turbine remains always at the area of greatest velocity.

A catamaran installation is shown in FIGS. 18 through 20, although any type of vessel may be used. A reaction turbine 124 according to the present invention, such as described in reference to any of the embodiments described above, is mounted to extend between two pontoons or hulls 126, 128 of the catamaran and oriented perpendicularly to the current flow, illustrated by arrows 130. The turbine 124 is mounted just below the water's surface 122, so that all of the turbine is submerged. Water flowing past the turbine blades 132 causes the blades 132 and shaft 134 to rotate, as discussed above.

Generally, the turbine is mounted in a housing 136 having a turbine chamber such as described above. The housing 136 has front and back openings 138 therein to allow the current flow 130 to pass through the housing 136 and past the turbine blades 132. The housing may be mounted to the pontoons 126, 128 in any suitable manner. However, in some applications, such as if the current velocity is sufficiently great, the housing may not need to be provided. Alternatively, a housing may be provided, but the offset circular configuration provided by the elevational changes in the top and bottom walls of the turbine chamber, as described above, may be omitted.

The shaft 134 may be connected to an electric generator 140 in any suitable manner, such as by a belted transmission 142. As shown, the electric generator may be housed in a suitable water tight chamber 144 on the vessel if desired. With current velocities of at least 5 feet per second, the turbine can reach speeds of 120 rpm or higher, at which the energy of the flowing fluid is converted to electrical energy using a minimal multiplicating transmission. In such applications, the present reaction turbine, particularly in the helical configuration, provides a more efficient energy conversion than do prior art turbines.

The invention is not to be limited by what has been particularly shown and described, except as indicated by the appended claims.

What is claimed is:

1. A reaction turbine capable of unidirectional rotation under reversible fluid flow comprising:
   a fluid flow path defined by an inflow fluid channel and an outflow fluid channel, and a turbine chamber disposed between said inflow and outflow channels;
   a rotatable shaft transversely mounted in said turbine chamber;
   at least one turbine blade support member fixedly mounted to said rotatable shaft for rotation therewith in a plane perpendicular to said shaft;
   a plurality of turbine blades disposed transversely in said turbine chamber in a helical configuration about said rotatable shaft, each blade having an airfoil shape having a leading edge and a trailing edge and an airfoil profile lying in a plane parallel to said flow path, each of said blades fixedly mounted to said blade support member to be radially spaced from said rotatable shaft for rotation in a plane parallel to said flow path in the direction of said leading edge.

2. The reaction turbine of claim 1, wherein said at least one turbine blade support member comprises a pair a parallel, circular discs fixedly supported on said rotatable shaft.

3. The reaction turbine of claim 2, wherein each of said plurality of turbine blades extends transversely between said discs of said pair of discs.

4. The reaction turbine of claim 2, wherein said at least one turbine blade support member further comprises a plurality of radial spokes disposed in spaced locations intermediate said discs of said pair of discs.

5. The reaction turbine of claim 1, wherein said at least one turbine blade support member comprises a plurality of radial spokes.

6. The reaction turbine of claim 1, wherein said at least one turbine blade support member comprises a disc fixedly centrally supported on said rotatable shaft.

7. The reaction turbine of claim 1, wherein said plurality of turbine blades comprise a first turbine blade having a left-handed orientation and a second turbine blade having a right-handed orientation.

8. The reaction turbine of claim 1, further comprising an electric generator operatively connected to said rotatable shaft.

9. The reaction turbine of claim 1, wherein said turbine chamber has a curved configuration having opposite elevations in the plane parallel to said fluid flow path, said elevations being offset in the direction of rotation of said leading edge to rotatably channel fluid in said flow path and to direct fluid flow to said plurality of blades with a radial component of flow relative to said blades.

10. The reaction turbine of claim 1, wherein said turbine chamber includes a top wall having a first top section having a curved configuration and a second top section having a curved configuration, the first and second top sections meeting at a top line adjacent to the circular trajectory of said blades, and said turbine chamber includes a bottom wall having a first bottom section having a curved configuration and a second bottom section having a curved configuration, the first and second bottom sections meeting at a bottom line adjacent to the circular trajectory of said blades.

11. The reaction turbine of claim 10, wherein at least one of said top line or said bottom line is offset in the direction of rotation from an axis through said rotatable shaft and perpendicular to said flow path.

12. A system for harnessing the energy of current flow of a water body, comprising:
   a vessel disposed at the surface of the water body;
   a unidirectional reaction turbine capable of rotation under reversible fluid flow and mounted to said vessel to be submerged below the surface of the water body, said unidirectional reaction turbine comprising:
   a rotatable shaft mounted to said vessel to extend perpendicularly to a direction of current flow;
   at least one turbine blade support member fixedly mounted to said rotatable shaft for rotation therewith in a plane perpendicular to said shaft;
   a plurality of turbine blades mounted to said turbine blade support member for rotation about said rotatable shaft, each blade having an airfoil shape having a leading edge and a trailing edge and an airfoil profile lying in a plane parallel to the current flow, each of said blades fixedly mounted to said blade support member to be radially spaced from said rotatable shaft for rotation in a plane parallel to said flow path in the direction of said leading edge;
   a housing mounted to said vessel, the unidirectional reaction turbine disposed within said housing, said housing having opposed openings therein to allow the current flow to pass through said housing and past said reaction turbine, said housing further comprising top and bottom walls, said top and bottom walls having a curved configuration providing opposite elevations in a plane parallel to said direction of current flow, said elevations being offset in a direction of rotation of said leading edge to rotatably channel fluid flowing through said housing and to direct fluid flow to said plurality of blades with a radial component of flow relative to said blades; and
   a generator operatively connected to said rotatable shaft.

13. The system of claim 12 wherein said turbine blades have a rectangular configuration.

14. The system of claim 12 wherein said turbine blades have a delta configuration.

15. The system of claim 12 wherein said turbine blades have a helical configuration.

16. The system of claim 12, wherein said generator is mounted to said vessel above the surface of the water body.

17. A system for harnessing the energy of a reversible fluid flow, comprising:

a turbine support disposed in a flow path of the fluid flow; and a reaction turbine capable of unidirectional rotation under reversible fluid flow and mounted to said turbine support, said reaction turbine comprising:
a rotatable shaft mounted to said turbine support to extend perpendicularly to a direction of fluid flow;
at least one turbine blade support member fixedly mounted to said rotatable shaft for rotation therewith in a plane perpendicular to said shaft; and
a plurality of turbine blades having a helical configuration mounted to said turbine blade support member for rotation about said rotatable shaft, each blade having an airfoil shape having a leading edge and a trailing edge and an airfoil profile lying in a plane parallel to the fluid flow, each of said blades fixedly mounted to said blade support member to be radially spaced from said rotatable shaft for rotation in a plane parallel to said flow path in the direction of said leading edge.

18. The system of claim 17, wherein said turbine support comprises a vessel disposed at a surface of a body of water.

19. The system of claim 18, wherein said vessel comprises a catamaran.

20. The system of claim 18, further comprising a housing mounted to said vessel, said reaction turbine disposed within said housing, said housing having opposed openings therein to allow a current flow to pass through said housing and past said reaction turbine.

21. The system of claim 17, wherein each of said turbine blades comprise at least two blades, at least one of said blades having a left-handed orientation and at least another of said blades having a right-handed orientation.

22. The system of claim 17, further comprising a generator mounted to said turbine support in communication with said reaction turbine.

23. A system for harnessing the energy of current flow of a water body, comprising:
a vessel disposed at the surface of the water body;
a unidirectional reaction turbine capable of rotation under reversible fluid flow and mounted to said vessel to be submerged below the surface of the water body, said unidirectional reaction turbine comprising:
a rotatable shaft mounted to said vessel to extend perpendicularly to a direction of current flow;
at least one turbine blade support member fixedly mounted to said rotatable shaft for rotation therewith in a plane perpendicular to said shaft;
a plurality of turbine blades mounted to said turbine blade support member for rotation about said rotatable shaft, each blade having a delta configuration, each blade having an airfoil shape having a leading edge and a trailing edge and an airfoil profile lying in a plane parallel to the current flow, each of said blades fixedly mounted to said blade support member to be parallel to and radially spaced from said rotatable shaft for rotation in a plane parallel to said flow path in the direction of said leading edge; and a generator operatively connected to said rotatable shaft.

24. The system of claim 23, wherein said generator is mounted to said vessel above the surface of the water body.

25. The system of claim 23, further comprising a housing mounted to said vessel, the unidirectional reaction turbine disposed within said housing, said housing having opposed openings therein to allow the current flow to pass through said housing and past said reaction turbine.

26. A system for harnessing the energy of current flow of a water body, comprising:
a vessel disposed at the surface of the water body;
a unidirectional reaction turbine capable of rotation under reversible fluid flow and mounted to said vessel to be submerged below the surface of the water body, said unidirectional reaction turbine comprising:
a rotatable shaft mounted to said vessel to extend perpendicularly to a direction of current flow;
at least one turbine blade support member fixedly mounted to said rotatable shaft for rotation therewith in a plane perpendicular to said shaft;
a plurality of turbine blades mounted to said turbine blade support member for rotation about said rotatable shaft, each blade having a helical configuration, each blade having an airfoil shape having a leading edge and a trailing edge and an airfoil profile lying in a plane parallel to the current flow, each of said blades fixedly mounted to said blade support member to be radially spaced from said rotatable shaft for rotation in a plane parallel to said flow path in the direction of said leading edge; and a generator operatively connected to said rotatable shaft.

27. The system of claim 26, wherein said generator is mounted to said vessel above the surface of the water body.

28. The system of claim 26, further comprising a housing mounted to said vessel, the unidirectional reaction turbine disposed within said housing, said housing having opposed openings therein to allow the current flow to pass through said housing and past said reaction turbine.

* * * * *